United States Patent Office 2,711,361
Patented June 21, 1955

2,711,361
PROCESS FOR THE RECOVERY OF URANIUM

George Oswald Morris, Rainhill, near Liverpool, England

No Drawing. Application April 30, 1948,
Serial No. 24,432

Claims priority, application Great Britain May 6, 1947

19 Claims. (Cl. 23—14.5)

This invention relates to a process for the recovery of uranium from materials containing the same and more particularly to a process for the recovery of uranium in the form of uranium peroxide from impure uranium tetrafluoride.

Impure uranium tetrafluoride which may be in the form of collected spillages or spoiled batches from manufacturing processes such as the hydrofluorination of uranium dioxide at elevated temperatures, or the precipitation of uranous sulphate solution with aqueous hydrogen fluoride has usually associated with it a number of impurities including iron, copper and nickel.

We have found that the recovery of uranium from the above described impure uranium tetrafluoride or from any other source of impure uranium tetrafluoride may be effected by first dissolving the impure substance in dilute sulphuric acid in the presence of excess hydrogen peroxide whereby uranyl sulphate is formed in solution and adding an excess of ammonia so as to precipitate the uranium as ammonium uranate. The precipitate is then washed and dissolved in sulphuric acid after which hydrogen peroxide is added and the uranium precipitated as uranium peroxide.

The first stage in the process, namely the dissolving of the impure uranium tetrafluoride in dilute sulphuric acid in the presence of hydrogen peroxide, is represented by the equation:

$$H_2O_2 + UF_4 + H_2SO_4 \rightarrow UO_2SO_4 + 4HF$$

In order to dissolve 1 gram molecule of uranium tetrafluoride we add an excess of sulphuric acid suitably about 125% of the stoichiometric quantity and 400 to 600% of the stoichiometric quantity of approximately 30% hydrogen peroxide. The temperature of the reaction should be maintained between 10° C. and the temperature at which hydrogen peroxide decomposes which is approximately 60° C. and preferably between 50° C. and 55° C. and the mixture stirred continuously for about 3 hours.

Advantageously, the hydrogen peroxide addition is made in two stages, 80 to 90% being added initially and the remainder 2 to 4 hours later after which we prefer to raise the temperature of the mixture gradually to the boiling point (102.5° C.) suitably over a period of 15–30 minutes and maintain it at this temperature until the uranium tetrafluoride is completely dissolved.

Should any decomposition of the hydrogen peroxide take place as a result of the catalytic action of impurities which may be present the second addition will always ensure complete reaction of residual fluoride.

In the second stage of the purification process ammonia is added to the uranyl sulphate-hydrofluoric acid solution in order to precipitate ammonium uranate. The ammonium fluoride which is also a product of the reaction, is removed by decantation.

Suitably we employ a 25% by volume solution of aqueous ammonia (S. G. 0.88) and if the final pH value of the solution is not less than 9 complete precipitation of the ammonium uranate occurs.

It is also important at this stage to obtain a maximum settling rate of the precipitate and this may be accomplished by addition of a wetting agent. For example, the addition of trimethyl cetyl ammonium bromide sufficient to give a 0.05% solution, is effective in coagulating the "fine" particles of the precipitate. Other wetting agents may also be employed depending on the nature of the impurities which may be present. For example, if calcium compounds are present we may with advantage add sodium oleyl para anisidine sulphonate.

The formation of a quick settling precipitate will depend also on the rate of addition of ammonia an on good mechanical agitation, the latter operation ensuring that the ammonia is rapidly distributed through the bulk of the solution. A quick settling rate suitable for commercial purposes may be obtained if the ammonia addition is spread over a period of 30 minutes or more, while the solution is constantly stirred.

The third stage of the purification process consists in dissolving the washed ammonium uranate in sulphuric acid to form uranyl sulphate according to the equation:

$$(NH_4)_2UO_4 + 2H_2SO_4 \rightarrow (NH_4)_2SO_4 + UO_2SO_4 + 2H_2O$$

In carrying out this reaction we prefer to add sufficient sulphuric acid and water to give a solution equivalent to approximately 10 grams of uranium per 100 cc. of solution and under these conditions complete solution of the ammonium uranate is effected.

In the last stage of the process, hydrogen peroxide is added to precipitate uranium as uranium peroxide dihydrate and the reaction proceeds according to the equation:

$$UO_2SO_4 + H_2O_2 + 2H_2O \rightarrow UO_4.2H_2O + H_2SO_4$$

Preferably the ammonium sulphate-uranyl sulphate is first treated with 0.88 S. G. ammonia in sufficient quantity to give a pH value of 3.0 which is suitable for the precipitation of quick settling uranium peroxide dihydrate. Thereafter hydrogen peroxide and 30–40% 880 ammonia are added so that the pH during the uranium peroxide dihydrate precipitation begins at a pH value of not greater than 3.0 and is complete at a pH value of not less than 2.0.

It is advisable to continue stirring for some time after precipitation, preferably for 1½ to 2½ hours to ensure completion of the reaction. The uranium peroxide is then allowed to settle and the mother liquor decanted. The precipitate is next washed several times and finally filtered and dried in an oven at approximately 140° C.

The following example illustrates but does not limit our invention, all parts being by weight:

Example 126.4 parts of crude uranium tetrafluoride containing 75.5% by weight uranium were suspended in 200 parts of water, and 50 parts of sulphuric acid, of specific gravity 1.84, were added.

The temperature rose to 52° C. due to the heat of solution of the acid and 180 parts of 30% hydrogen peroxide were added and the mixture stirred for 3 hours while maintaining the temperature between 50° C. and 55° C. throughout.

33.8 parts of 30% hydrogen peroxide were again added and the temperature was raised to the boiling point of the solution (102.5° C.). After 40 minutes the uranium tetrafluoride had dissolved and the excess hydrogen peroxide had decomposed.

The solution containing the products of reaction, uranyl sulphate and hydrofluoric acid, was diluted with water to approximately 4 times and 825 parts of dilute ammonia solution containing 25% of 0.88 S. G. ammonia in water were added in a well stirred vessel at room temperature. The ammonia addition was spread over 30 minutes during which time ammonium uranate was precipitated and the final pH of the liquid was 9.25.

In order to facilitate the settling of the precipitate a strong solution of trimethyl cetyl ammonium bromide sufficient to give a 0.05 gm. per 100 cc. solution was added, and the mother liquor was decanted off and the remaining precipitate washed. The process of washing by stirring the precipitate in water followed by decantation was repeated several times to ensure that all the ammonium fluoride had been removed.

After the last removal of wash liquor from the uranate, sufficient water and 80.2 parts of sulphuric acid (S. G. 1.84) were added to the precipitate to give a solution equivalent to 10 grams uranium per 100 cc. of solution. The precipitate completely dissolved in the acid to give a solution of uranyl sulphate.

The pH value of the solution was next adjusted to 3.2 by adding 44 parts ammonia (S. G. 0.88) before addition of hydrogen peroxide in order to provide for a quick settling rate of precipitate. The solution was vigorously stirred while adding 107 parts of 30% hydrogen peroxide and ammonia over a period of 10 minutes.

After precipitation of the uranium peroxide stirring was continued for 2 hours in order to complete the reaction and the uranium peroxide was allowed to settle. The mother liquor was then siphoned off and the precipitate was given four water washes in each of which the settled precipitate was stirred with enough water to give the same volume of suspension as obtained after the reaction.

The uranium peroxide was next filtered and dried at 140° C. for 24 hours and weighed.

The results showed that 97.7% of the uranium had been recovered.

I claim:

1. A process for the recovery of substantially pure uranium in the form of uranium peroxide from impure uranium tetrafluoride which comprises the steps of dissolving the impure uranium tetrafluoride in excess dilute sulphuric acid in the presence of excess hydrogen peroxide, precipitating ammonium uranate from the solution so formed by adding an excess of aqueous ammonia, dissolving the precipitate in sulphuric acid and adding hydrogen peroxide to precipitate uranium peroxide.

2. A process for the recovery of substantially pure uranium in the form of uranium peroxide from impure uranium tetrafluoride which comprises the steps of dissolving the impure uranium tetrafluoride in approximately 125% of the stoichiometric quantity of sulphuric acid in the presence of 400 to 600% of the stoichiometric quantity of hydrogen peroxide, precipitating ammonium uranate from the solution so formed by adding an excess of aqueous ammonia, dissolving the said precipitate in sulphuric acid and adding hydrogen peroxide to precipitate the uranium as uranium peroxide.

3. A process for the recovery of substantially pure uranium in the form of uranium peroxide from impure uranium tetrafluoride which comprises the steps of dissolving the impure uranium tetrafluoride in approximately 125% of the stoichiometric quantity of sulphuric acid in the presence of 400 to 600% of the stoichiometric quantity of hydrogen peroxide, at a temperature between 10° and 60° C., precipitating ammonium uranate from the solution so formed by adding an excess of aqueous ammonia, dissolving the said precipitate in sulphuric acid and adding hydrogen peroxide to precipitate the uranium as uranium peroxide.

4. A process according to claim 3 in which the impure uranium tetrafluoride is dissolved in the sulphuric acid at a temperature between 50° and 55° C.

5. A process for the recovery of substantially pure uranium in the form of uranium peroxide from impure uranium tetrafluoride which comprises the steps of dissolving the impure uranium tetrafluoride in approximately 125% of the stoichiometric quantity of sulphuric acid, adding 400 to 600% of the stoichiometric quantity of hydrogen peroxide in two stages, 80 to 90% being first added and the remainder 2 to 4 hours later while the temperature of the solution is raised to the boiling point, precipitating ammonium uranate from the solution so formed by adding an excess of aqueous ammonia, dissolving the precipitate in sulphuric acid and adding hydrogen peroxide to precipitate the uranium as uranium peroxide.

6. A process for the recovery of substantially pure uranium in the form of uranium peroxide from impure uranium tetrafluoride which comprises the steps of dissolving the impure uranium tetrafluoride in approximately 125% of the stoichiometric quantity of sulphuric acid at a temperature between 10° and 60° C. adding 400 to 600% of the stoichiometric quantity of hydrogen peroxide in two stages, 80 to 90% being first added and the remainder from 2 to 4 hours later while the temperature of the solution is raised to the boiling point, precipitating ammonium uranate from the solution so formed by adding an excess of aqueous ammonia, dissolving the precipitate in sulphuric acid and adding hydrogen peroxide to precipitate the uranium as uranium peroxide.

7. A process for the recovery of substantially pure uranium in the form of uranium peroxide from impure uranium tetrafluoride which comprises the steps of dissolving the impure uranium tetrafluoride in approximately 125% of the stoichiometric quantity of sulphuric acid at a temperature between 50° and 55° C. adding 400 to 600% of the stoichiometric quantity of hydrogen peroxide in two stages, 80 to 90% being first added and the remainder more than two hours later while the temperature of the solution is raised to the boiling point, precipitating ammonium uranate from the solution so formed by adding an excess of aqueous ammonia, dissolving the precipitate in sulphuric acid and adding hydrogen peroxide to precipitate the uranium as uranium peroxide.

8. A process according to claim 1 in which precipitation of ammonium uranate is effected by the addition of an approximately 25% by volume solution of aqueous ammonia of specific gravity approximately 0.88 in sufficient quantity to give a pH to the solution of at least 9 to ensure complete precipitation.

9. A process for the recovery of substantially pure uranium in the form of uranium peroxide from impure uranium tetrafluoride which comprises the steps of dissolving the impure uranium tetrafluoride in approximately 125% of the stoichiometric quantity of sulphuric acid at a temperature between 10° and 60° C. adding 400 to 600% of the stoichiometric quantity of hydrogen peroxide in two stages, 80 to 90% being first added and the remainder 2 to 4 hours later while the temperature of the solution is raised to the boiling point, precipitating ammonium uranate from the solution so formed by adding an approximately 25% by volume solution of aqueous ammonia of specific gravity approximately 0.88 in sufficient quantity to give a pH value to the solution of at least 9 to ensure complete precipitation, dissolving the precipitate in sulphuric acid and adding hydrogen peroxide to precipitate the uranium as uranium peroxide.

10. A process for the recovery of substantially pure uranium in the form of uranium peroxide from impure uranium tetrafluoride which comprises the steps of dissolving the impure uranium tetrafluoride in approximately 125% of the stoichiometric quantity of sulphuric acid at a temperature between 50°–55° C. adding 400 to 600% of the stoichiometric quantity of hydrogen peroxide in two stages, 80 to 90% being first added and the remainder more than two to four hours later while the temperature of the solution is raised to the boiling point, precipitating ammonium uranate from the solution so formed by adding an approximately 25% by volume solution of aqueous ammonia of specific gravity approximately 0.88 in sufficient quantity to give a pH value to the solution of at least 9 to ensure complete precipitation, dissolving the precipitate in sulphuric acid and adding hydrogen peroxide to precipitate the uranium as uranium peroxide.

11. A process according to claim 1 in which a wetting agent is added during the precipitation of ammonium uranate.

12. A process for the recovery of substantially pure uranium in the form of uranium peroxide from impure uranium tetrafluoride which comprises the steps of dissolving the impure uranium tetrafluoride in approximately 125% of the stoichiometric quantity of sulphuric acid, adding 400 to 600% of the stoichiometric quantity of hydrogen peroxide in two stages, 80 to 90% being first added and the remainder 2 to 4 hours later while the temperature of the solution is raised to the boiling point, precipitating ammonium uranate from the solution so formed by adding an excess of aqueous ammonia, while adding a wetting agent during the precipitation, dissolving the precipitate in sulphuric acid and adding hydrogen peroxide to precipitate the uranium as uranium peroxide.

13. A process for the recovery of substantially pure uranium in the form of uranium peroxide from impure uranium tetrafluoride which comprises the steps of dissolving the impure uranium tetrafluoride in approximately 125% of the stoichiometric quantity of sulphuric acid at a temperature between 10° and 60° C., adding approximately 400 to 600% of the stoichiometric quantity of hydrogen peroxide in two stages, 80 to 90% being first added and the remainder more than two to four hours later while the temperature of the solution is raised to the boiling point, precipitating ammonium uranate from the solution so formed by adding an excess of aqueous ammonia, while adding a wetting agent during the precipitation, dissolving the precipitate in sulphuric acid and adding hydrogen peroxide to precipitate the uranium as uranium peroxide.

14. A process for the recovery of substantially pure uranium in the form of uranium peroxide from impure uranium tetrafluoride which comprises the steps of dissolving the impure uranium tetrafluoride in approximately 125% of the stoichiometric quantity of sulphuric acid at a temperature between 50° and 55° C. adding approximately 400 to 600% of the stoichiometric quantity of hydrogen peroxide in two stages, 80 to 90% being first added and the remainder 2 to 4 hours later while the temperature of the solution is raised to the boiling point, precipitating ammonium uranate from the solution so formed by adding an excess of aqueous ammonia, while adding a wetting agent during the precipitation, dissolving the precipitate in sulphuric acid and adding hydrogen peroxide to percipitate the uranium as uranium peroxide.

15. A process for the recovery of substantially pure uranium in the form of uranium peroxide from impure uranium tetrafluoride which comprises the steps of dissolving the impure uranium tetrafluoride in approximately 125% of the stoichiometric quantity of sulphuric acid at a temperature between 10° and 60° C. adding 400 to 600% of the stoichiometric quantity of hydrogen peroxide in two stages, 80 to 90% being first added and the remainder more than two hours later while the temperature of the solution is raised to the boiling point, precipitating ammonium uranate from the solution so formed by adding an approximately 25% by volume solution of aqueous ammonia of specific gravity approximately 0.88 in sufficient quantity to give a pH value to the solution of at least 9 to ensure complete precipitation, while adding a wetting agent during the precipitation, dissolving the precipitate in sulphuric acid and adding hydrogen peroxide to precipitate the uranium as uranium peroxide.

16. A process for the recovery of substantially pure uranium in the form of uranium peroxide from impure uranium tetrafluoride which comprises the steps of dissolving the impure uranium tetrafluoride in approximately 125% of the stoichiometric quantity of sulphuric acid in the presence of 400 to 600% of the stoichiometric quantity of hydrogen peroxide, precipitating the ammonium uranate from the solution so formed by adding an excess of aqueous ammonia, while adding as wetting agent trimethyl cetyl ammonium bromide in an amount sufficient to give a 0.05% solution, dissolving the said precipitate in sulphuric acid and adding hydrogen peroxide to precipitate the uranium as uranium peroxide.

17. A process for the recovery of substantially pure uranium in the form of uranium peroxide from impure uranium tetrafluoride which comprises the steps of dissolving the impure uranium tetrafluoride in approximately 125% of the stoichiometric quantity of sulphuric acid at a temperature between 50° and 55° C., adding 400 to 600% of the stoichiometric quantity of hydrogen peroxide in two stages, 80 to 90% being first added and the remainder more than two to four hours later while the temperature of the solution is raised to the boiling point, precipitating ammonium uranate from the solution so formed by adding an excess of aqueous ammonia, while adding as wetting agent trimethyl cetyl ammonium bromide in an amount sufficient to give a 0.05% solution, dissolving the precipitate in sulphuric acid and adding hydrogen peroxide to precipitate the uranium as uranium peroxide.

18. A process for the recovery of substantially pure uranium in the form of uranium peroxide from impure uranium tetrafluoride which comprises the steps of dissolving the impure uranium tetrafluoride in approximately 125% of the stoichiometric quantity of sulphuric acid at a temperature between 10° and 60° C., adding approximately 400 to 600% of the stoichiometric quantity of hydrogen peroxide in two stages, 80 to 90% being first added and the remainder 2 to 4 hours later while the temperature of the solution is raised to the boiling point, precipitating ammonium uranate from the solution so formed by adding an approximately 25% by volume solution of aqueous ammonia, while adding as wetting agent trimethyl cetyl ammonium bromide in an amount sufficient to give a 0.05% solution, dissolving the precipitate in sulphuric acid and adding hydrogen peroxide to precipitate the uranium as uranium peroxide.

19. A process for the recovery of substantially pure uranium in the form of uranium peroxide from impure uranium tetrafluoride which comprises the steps of dissolving the impure uranium tetrafluoride in approximately 125% of the stoichiometric quantity of sulphuric acid while maintaining the temperature between 50° and 55° C. and adding 400 to 600% of the stoichiometric quantity of approximately 30% hydrogen peroxide in two stages 80 to 90% of the total quantity of hydrogen peroxide being first added and the remainder being added from 2 to 4 hours later, the temperature of the mixture being then raised to the boiling point and maintained at this temperature until the uranium tetrafluoride is completely dissolved, precipitating ammonium uranate from the solution so formed by adding an approximately 25% by volume solution of aqueous ammonia of specific gravity approximately 0.88 in sufficient quantity to give a pH value to the solution of at least 9 to ensure complete precipitation while adding as wetting agent trimethyl cetyl ammonium bromide in an amount sufficient to give a 0.05% solution, dissolving the precipitate in sulphuric acid and adding hydrogen peroxide to precipitate the uranium as uranium peroxide.

No references cited.